(12) United States Patent
Otani et al.

(10) Patent No.: US 7,881,988 B2
(45) Date of Patent: Feb. 1, 2011

(54) PRODUCT DISPLAY RACK SYSTEM AND PURCHASING BEHAVIOR ANALYSIS PROGRAM

(75) Inventors: Yoshinori Otani, Kyoto (JP); Kiyoshi Kanai, Kodaira (JP); Tohru Kaneko, Shinagawa (JP); Katsumasa Kishida, Shinagawa (JP); Hirofumi Tsutsumimoto, Shinagawa (JP)

(73) Assignees: Hitachi Information Systems, Ltd., Tokyo (JP); Hitachi Kokusai Electric Inc., Tokyo (JP); Tana-X-Inc., Kyoto (JP)

( * ) Notice: Subject to any disclaimer, the term of this patent is extended or adjusted under 35 U.S.C. 154(b) by 260 days.

(21) Appl. No.: 11/991,150

(22) PCT Filed: Oct. 23, 2006

(86) PCT No.: PCT/JP2006/321017

§ 371 (c)(1),
(2), (4) Date: May 12, 2008

(87) PCT Pub. No.: WO2007/049533

PCT Pub. Date: May 3, 2007

(65) Prior Publication Data

US 2009/0153328 A1      Jun. 18, 2009

(30) Foreign Application Priority Data

Oct. 24, 2005     (JP) ............................. 2005 308010

(51) Int. Cl.
*G06Q 10/00* (2006.01)

(52) U.S. Cl. .................... 705/28; 705/10; 340/572.1

(58) Field of Classification Search ................ None
See application file for complete search history.

(56) References Cited

U.S. PATENT DOCUMENTS

| | | | |
|---|---|---|---|
| 6,659,344 B2* | 12/2003 | Otto et al. | 235/381 |
| 6,714,121 B1* | 3/2004 | Moore | 340/10.3 |
| 6,747,560 B2* | 6/2004 | Stevens, III | 340/572.4 |
| 7,475,813 B2* | 1/2009 | Swanson, Sr. | 235/383 |
| 2007/0182555 A1* | 8/2007 | Walker et al. | 340/572.1 |

FOREIGN PATENT DOCUMENTS

| | | |
|---|---|---|
| JP | 64-088214 | 4/1989 |
| JP | 2004-133583 | 4/2004 |
| JP | 2005-275872 | 10/2005 |

\* cited by examiner

*Primary Examiner*—F. Zeender
*Assistant Examiner*—Luna Champagne
(74) *Attorney, Agent, or Firm*—Wenderoth, Lind & Ponack, L.L.P.

(57) ABSTRACT

A system with an intelligent shelf (100) has product display shelves (110 to 130) displaying products having RFID tags R. The system includes antennas (112a to 112c) each having unique antenna numbers and detecting a tag serial number from an RFID tag on a product, human body sensors S disposed on each end of the product display shelf 120, a tag-product ID registration table storing the tag serial numbers of the RFID tags and the product IDs of the products and a control computer (200) detecting that a particular product is picked up from and/or returned to a particular product display shelf by combining the input tag serial number and the antenna number of the antenna detecting the tag serial number and analyzing which direction the detected human body has moved based on the difference of the detection times of the human body sensors.

7 Claims, 12 Drawing Sheets

FIG. 4

201 tag table

| registration date and time | UID (tag serial No.) | product code | product ID | number of times reused |
|---|---|---|---|---|
| 2005/7/10 16:21 | FFFFFFFFFF0001 | 0000000001 | 0111 | 5 |
| 2005/6/20 15:11 | FFFFFFFFFF0001 | 0000000120 | 0082 | 4 |
| 2005/6/16 17:32 | FFFFFFFFFF0001 | 0000000015 | 0076 | 3 |
| 2005/6/15 20:18 | FFFFFFFFFF0001 | 0000000011 | 0031 | 2 |
| 2005/6/12 16:21 | FFFFFFFFFF0001 | 0000000256 | 0007 | 1 |

FIG. 5

202 tag-product ID registration table

| | UID(tag serial No.) | product name | product ID | number of times reused |
|---|---|---|---|---|
| 1 | FFFFFFFFFF0001 | detergent A | 0111 | 5 |
| 2 | FFFFFFFFFF0002 | detergent A | 0111 | 2 |
| 3 | FFFFFFFFFF0003 | detergent A | 0111 | 1 |
| 4 | FFFFFFFFFF0004 | detergent B | 0132 | 8 |
| 5 | FFFFFFFFFF0005 | detergent B | 0132 | 6 |
| 6 | FFFFFFFFFF0006 | detergent B | 0132 | 2 |
| 7 | FFFFFFFFFF0007 | detergent C | 0063 | 9 |

FIG. 6

203 search result list display image

| | product category | product name | product code | product ID | UID (tag serial No.) | tag registration date | store name | shelf No. | antenna No. | display position | display beginning date | display ending date | picking-up count |
|---|---|---|---|---|---|---|---|---|---|---|---|---|---|
| 1 | detergent | detergent A | 0000000001 | 0111 | FFFFFFFFFFFF0001 | 2005/2/1 | Shibuya store | 001 | 1-2 | first row, center | 2005/2/3 | 2005/2/5 | 1 |
| 2 | detergent | detergent A | 0000000001 | 0111 | FFFFFFFFFFFF0002 | 2005/2/1 | Shibuya store | 001 | 1-2 | first row, center | 2005/2/3 | | 0 |
| 3 | detergent | detergent A | 0000000001 | 0111 | FFFFFFFFFFFF0003 | 2005/2/1 | Shibuya store | 001 | 1-2 | first row, center | 2005/2/3 | | 0 |
| 4 | detergent | detergent B | 0000000002 | 0123 | FFFFFFFFFFFF0004 | 2005/2/5 | Shibuya store | 001 | 1-3 | first row, right | 2005/2/8 | 2005/2/10 | 0 |
| 5 | detergent | detergent B | 0000000002 | 0123 | FFFFFFFFFFFF0005 | 2005/2/5 | Shibuya store | 001 | 1-3 | first row, right | 2005/2/8 | | 0 |
| 6 | detergent | detergent C | 0000000003 | 0146 | FFFFFFFFFFFF0007 | 2005/3/8 | Shibuya store | 001 | 1-1 | first row, left | 2005/3/9 | 2005/3/9 | 0 |
| 7 | detergent | detergent C | 0000000003 | 0146 | FFFFFFFFFFFF0009 | 2005/3/8 | Shibuya store | 001 | 1-1 | first row, left | 2005/3/9 | | |
| 8 | shampoo | shampoo D | 0000000023 | 0302 | FFFFFFFFFFFF0028 | 2005/4/6 | Shibuya store | 001 | 2-1 | second row, left | 2005/4/7 | 2005/4/9 | 3 |
| 9 | shampoo | shampoo E | 0000000025 | 0305 | FFFFFFFFFFFF0067 | 2005/6/1 | Shibuya store | 001 | 2-2 | second row, center | 2005/6/3 | | 1 |

| date and time | No. | product category | product name | product code | product ID | UID (tag serial No.) | tag registration date |
|---|---|---|---|---|---|---|---|
| year 2005 month October day 01 hour 18 minute 01 second 01 | 1 | detergent | detergent A | 0000000001 | 0111 | FFFFFFFFFF0001 | 2005/2/1 |
| | 2 | detergent | detergent A | 0000000001 | 0111 | FFFFFFFFFF0002 | 2005/2/1 |
| | 3 | detergent | detergent A | 0000000001 | 0111 | FFFFFFFFFF0003 | 2005/2/1 |
| | 4 | detergent | detergent B | 0000000002 | 0123 | FFFFFFFFFF0004 | 2005/2/5 |
| | 5 | detergent | detergent B | 0000000002 | 0123 | FFFFFFFFFF0005 | 2005/2/5 |
| | 6 | detergent | detergent C | 0000000003 | 0146 | FFFFFFFFFF0007 | 2005/3/8 |
| | 7 | detergent | detergent C | 0000000003 | 0146 | FFFFFFFFFF0009 | 2005/3/8 |
| | 8 | shampoo | shampoo D | 0000000023 | 0302 | FFFFFFFFFF0028 | 2005/4/6 |
| | 9 | shampoo | shampoo E | 0000000025 | 0305 | FFFFFFFFFF0067 | 2005/6/1 |

| store name | shelf No. | antenna No. | display position | display beginning date | display ending date | picking-up count | picking-up flag |
|---|---|---|---|---|---|---|---|
| Shibuya store | 001 | 1-2 | first row, center | 2005/2/3 | 2005/2/5 | 1 | 1 |
| Shibuya store | 001 | 1-2 | first row, center | 2005/2/3 | | 0 | 0 |
| Shibuya store | 001 | 1-2 | first row, center | 2005/2/3 | | 0 | 0 |
| Shibuya store | 001 | 1-3 | first row, right | 2005/2/8 | 2005/2/10 | 3 | 1 |
| Shibuya store | 001 | 1-3 | first row, right | 2005/2/8 | | 0 | 0 |
| Shibuya store | 001 | 1-1 | first row, left | 2005/3/9 | 2005/3/9 | 5 | 1 |
| Shibuya store | 001 | 1-1 | first row, left | 2005/3/9 | | 0 | 0 |
| Shibuya store | 001 | 2-1 | second row, left | 2005/4/7 | 2005/4/9 | 3 | 1 |
| Shibuya store | 001 | 2-2 | second row, center | 2005/6/3 | | 1 | 0 |

US 7,881,988 B2

PRODUCT DISPLAY RACK SYSTEM AND PURCHASING BEHAVIOR ANALYSIS PROGRAM

This application is the National Stage of International Application No. PCT/JP2006/321017, filed Oct. 23, 2006.

BACKGROUND OF THE INVENTION

1. Field of Invention

The present invention relates to a product displaying system and a purchase behavior analysis program for collecting information representing purchase behavior of customers for various kinds of products displayed on display shelves in retail stores (purchase behavior information), and more particularly relates to a product displaying system and a purchase behavior analysis program for collecting purchase behavior information of customers for products based on the numbers of times the customers picked up the products from the display shelves and behavior of the customers.

2. Description of the Related Art

Generally, retail stores use display shelves in which the products are displayed in rows thereon and customers pick up a displayed product and purchases the product or returns the product onto the shelves. Retail stores and product makers desires to collect behavior information of the customers for the products displayed on the display shelves, analyze purchase behavior information of the customers based on the customers' (consumers') behavior and lay out a merchandising strategy with more appropriate product development/displaying method/product supplement.

Purchase behavior information of customers purchasing products has been conventionally collected by employing researchers who monitor the behavior of the customers and take notes of the kind of products the customers picked up and the frequencies that each product is picked up. The purchase behavior information collected in such a way lacks in correctness and objectivity.

A technique to collect purchase behavior information of customers is disclosed in the Patent Document 1. The Patent Document 1 discloses a technique to specify the product picked up by a customer by using a display shelf having a plurality of spaces for displaying products and an IC tag reader installed on such a location that the IC tag reader can read information stored in a noncontact IC tag equipped with each product when the product is picked up by a customer, such that the IC tag reader reads IC tag information and source ID information of a product when the product is picked up from the shelf and stores the information in a database.

Also disclosed in the Patent Document 2 is an analyzing technique in which information on whether or not the products equipped with IC tags are picked up by customers, information of the routes customers have taken in the retail store and information of the length of time customers stayed on a particular location on the retail store are obtained and the obtained information is combined to specify the products which was not purchased by customers analyze the reason.

Patent Document 1: Japanese Patent Laid-open No. 2005 92376.

Patent Document 2: Japanese Patent Laid-open No. 2004-348681.

BRIEF SUMMARY OF THE INVENTION

Problems to be Solved by the Invention

The above-mentioned technique of Patent Document 1, in which the IC tag reader is installed on the front side (customers' side) of the display shelf and the IC tag reader detects the customer's picking up of the products, has such problems that the IC tag reader can not detect the customer's picking up of the product when the product does not come close to the IC tag reader, that the IC tag reader which needs to be installed in front of the products is seen by the customers, that the IC tag reader cannot detect the customer's returning of the products on to the shelf after picking up the products and that it is impossible to analyze the customers' behavior in the vicinity of the display shelf.

The above-mentioned technique of Patent Document 2, which enables to detect the customer's walking route be means of the sensors installed in the store and to analyze the purchase of the product picked up by the customers, has such problems that it is difficult to analyze the customers' detailed behavior of selecting the products in vicinity of the display shelf.

Furthermore, there was such a problem in the prior art that it falsely detects the products picked up by the customers when the products are overturned or fall off the shelf due to earthquake shaking or the like.

It is an object of the present invention to solve the above-mentioned problems by providing a product displaying system and a purchase behavior analysis program which enables detection of the customer's returning of the products onto the shelf after picking up the products, to analyze the customers' interest level (the length of time being picked up) for each product and the amount of each product purchased and to prevent false detection due to the overturning of the product and the like.

Means for Solving the Problems

In order to achieve the objective of the present invention, a first aspect of the present invention provides a product displaying system comprising:

a plurality of product display shelves on which a plurality of kinds of products each applied with RFID tags storing uniquely given tag serial numbers are displayed;

a plurality of antennas disposed on said product display shelves, each having unique antenna numbers and detecting a tag serial number from an RFID tag on a product within a predetermined area;

human body sensors disposed on different positions on the front side of said product display shelves and detecting a human body approaching thereto; and a control computer having a tag-product ID registration table storing the tag serial numbers of said RFID tags and the product IDs of the products uniquely given to the products, each tag serial number corresponding to each product ID, wherein the control computer being inputted a tag serial number of an RFID tag detected by said antennas and a detection time of said human body sensors, detecting that a particular product is picked up from and/or returned to a particular product display shelf by combining the tag serial number of the RFID tag and the antenna number of the antenna detecting the tag serial number, and analyzing which direction the detected human body moved in based on the difference of the detection times of said human body sensors.

A second aspect of the present invention provides the product displaying system as set forth in the first aspect of the invention, further comprising:

a plurality of partitions partitioning said product display shelves into a plurality of areas on each of which said antenna is set, and switches and reader/writers or reader/writers having switching function switching antennas to send the tag serial numbers of said RFID tags to said control computer.

A third aspect of the present invention provides the product displaying system as set forth in the first or second aspect of the invention, wherein said antennas disposed on predetermined positions of said product display shelves communicate with said RFID tags applied on the surfaces of the products.

A fourth aspect of the present invention provides the product displaying system as set forth in the first or second aspect of the invention, wherein said antennas disposed on predetermined positions of said product display shelves communicate with said RFID tags applied on the top of the products.

A fifth aspect of the present invention provides the product displaying system as set forth in the first or second aspect of the invention, wherein said control computer comprises a display device, thereby displaying a first bar indication representing in time series the times at which a particular product on a particular product display shelf were picked up and returned thereto and a second bar indication representing in time series the times at which a human body is or is not detected by said human body sensors.

A sixth aspect of the present invention provides the product displaying system as set forth in the third aspect of the invention, wherein said control computer comprises a display device, thereby displaying a first bar indication representing in time series the times at which a particular product on a particular product display shelf were picked up and returned thereto and a second bar indication representing in time series the times at which a human body is or is not detected by said human body sensors.

A seventh aspect of the present invention provides the product displaying system as set forth in the fourth aspect of the invention, wherein said control computer comprises a display device, thereby displaying a first bar indication representing in time series the times at which a particular product on a particular product display shelf were picked up and returned thereto and a second bar indication representing in time series the times at which a human body is or is not detected by said human body sensors.

An eighth aspect of the present invention provides a purchase behavior analysis program analyzing customers' purchase behavior for products displayed on product display shelves using RFID tags for use in a product displaying system comprising:

a plurality of product display shelves on which a plurality of kinds of products each applied with RFID tags storing uniquely given tag serial numbers are displayed;

a plurality of antennas disposed on said product display shelves, each having unique antenna numbers and detecting a tag serial number from an RFID tag on a product within a predetermined area;

human body sensors disposed on different positions on the front side of said product display shelves and detecting a human body approaching thereto;

a control computer having a tag-product ID registration table storing the tag serial numbers of said RFID tags and the product IDs of the products uniquely given to the products, each tag serial number corresponding to each product ID, the control computer being inputted a tag serial number of an RFID tag detected by said antennas and a detection time of said human body sensors; and a display device, wherein said control computer implements a function of detecting that a particular product is picked up from and/or returned to a particular product display shelf by combining the tag serial number of the RFID tag and the antenna number of the antenna detecting the tag serial number and a function of judging which direction the detected human body moved in based on the difference of the detection times of said human body sensors.

A ninth aspect of the present invention provides the product displaying system as set forth in the eighth aspect of the invention, wherein said control computer implements a first bar indication function of displaying in said display device the times at which a particular product on a particular product display shelf were picked up and returned thereto in time series and a second bar indication function of displaying in said display device the times at which a human body is or is not detected by said human body sensors in time series.

According to the product displaying system and the purchase behavior analysis program of the present invention, it is possible to, based on the combined information of tag serial numbers of the RFID tags and antennas detecting the tag serial numbers, collect purchase behavior information of customers by analyzing information of particular products on particular shelf being picked up and being returned and customers' moving direction detected by plurality of human body sensor based on the detection time difference.

BRIEF DESCRIPTION OF THE DRAWINGS

FIG. 4 A view showing a tag table of the present embodiment.

FIG. 5 A view showing product list table of the present embodiment.

FIG. 6 A view showing search result list display image of the present embodiment.

FIG. 11 A view showing the master data table of the present embodiment.

DETAILED DESCRIPTION OF THE INVENTION

An embodiment of the product displaying system and the purchase behavior analysis program of the present invention will be below described in detail with reference to the drawings.

Figure 1:
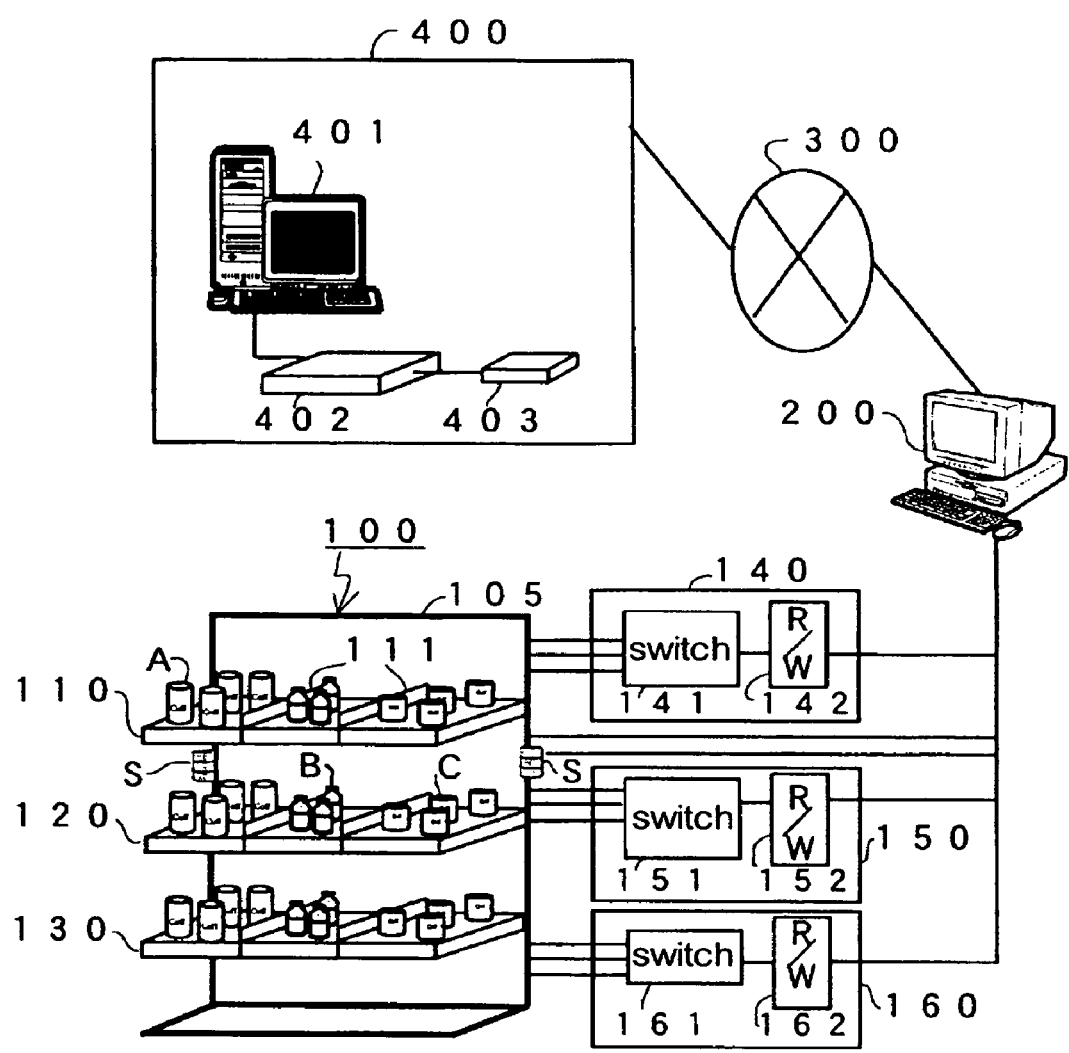
FIG. 1 An overall construction view of the purchase behavior analysis system adopting the product displaying system of the present embodiment.

FIG. 1 shows the purchase behavior analysis system which includes the product displaying system and the purchase behavior analysis program of the present embodiment. The purchase behavior analysis system comprises an intelligent shelf 100 having data sending units 140 to 160 for sending information obtained from each of the shelves on which various kinds of products are displayed, a control computer 200 managing the information received from the data sending units 140 to 160 and a center server system 400 connected with the control computer 200 by way of a communication line 300.

The RFID tag R used in the present embodiment has a tag serial number (UID) uniquely given to each tag, a product code corresponding to the product on which the RFID tag is applied and a memory for storing the number of times the tag is reused. The RFID tag R obtains electric power from external magnetic field (electric wave) so as to send and receive data. It is also possible that memory does not store the product code corresponding to the product on which the RFID tag is applied and the number of times the tag is reused while the center server system 400 manages such information.

Figure 2:
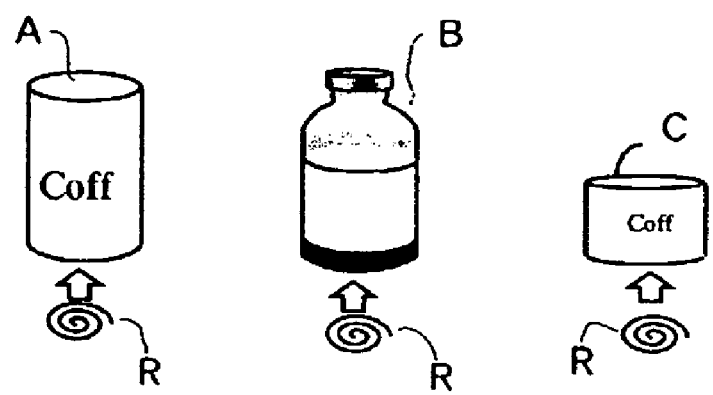
FIG. 2 A view showing the products and RFID tags adopted the present embodiment.
Figure 3:
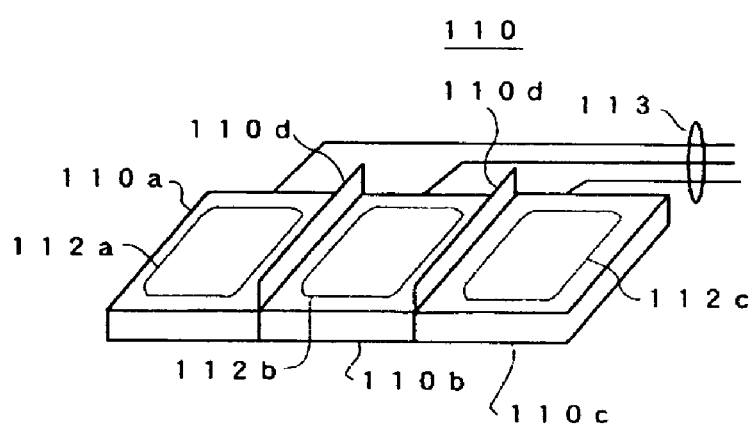
FIG. 3 A view showing an example of product display shelf of the present embodiment.

The products A to C displayed on the intelligent shelf 100 each has an RFID tag R applied, for example, on the bottom face or surface thereof as shown in FIG. 2. The display shelf 110 for displaying the products A to C, for example, has partitions 110d which divides the shelf space into a plurality of shelf areas 110a to 110c as shown in FIG. 3. The shelf areas 110a to 110c are each equipped with antennas 112a to 112c for sending and receiving data with the RFID tags R on the products and the antennas 112a to 112c are each connected to signal lines 113.

The display shelf 110 of the present embodiment communicates data in condition that the RFID tags R applied on the bottom face or surface of the products displayed on the shelf areas 110a to 110c come into the vicinity thereof (for example 30 mm). The display shelf 110 is formed in such a way that the shelf areas 110a to 110c are prevented from causing interference with each other by means of the partitions 110d. The partitions 110d are made of acrylic plates or metal plates, for example, such that the antennas for the RFID tags on the neighboring shelf areas do not interference with each other. In the present invention, however, it is not necessary to employ partitions in case the radio wave coverage characteristics of the antennas are made low.

As shown in FIG. 1, the intelligent shelf 100 comprises three rows of product display shelves 110 to 130 on which the products are placed and a plurality of human body sensors S for detecting the human bodies approaching disposed in different position of the front side of the product display shelf 120. The data sending unit 140 comprises a switch 141 for switching the signals inputted from the antennas 112a to 112c of the product display shelf 110 through the signal wire 130 and a reader/writer 142 for sending to the control computer 200 detection signals of RFID tag R inputted from the switch 141. Similarly the data sending unit 150/160 each comprises a switch 151/161 and a reader/writer 152/162.

Figure 8:
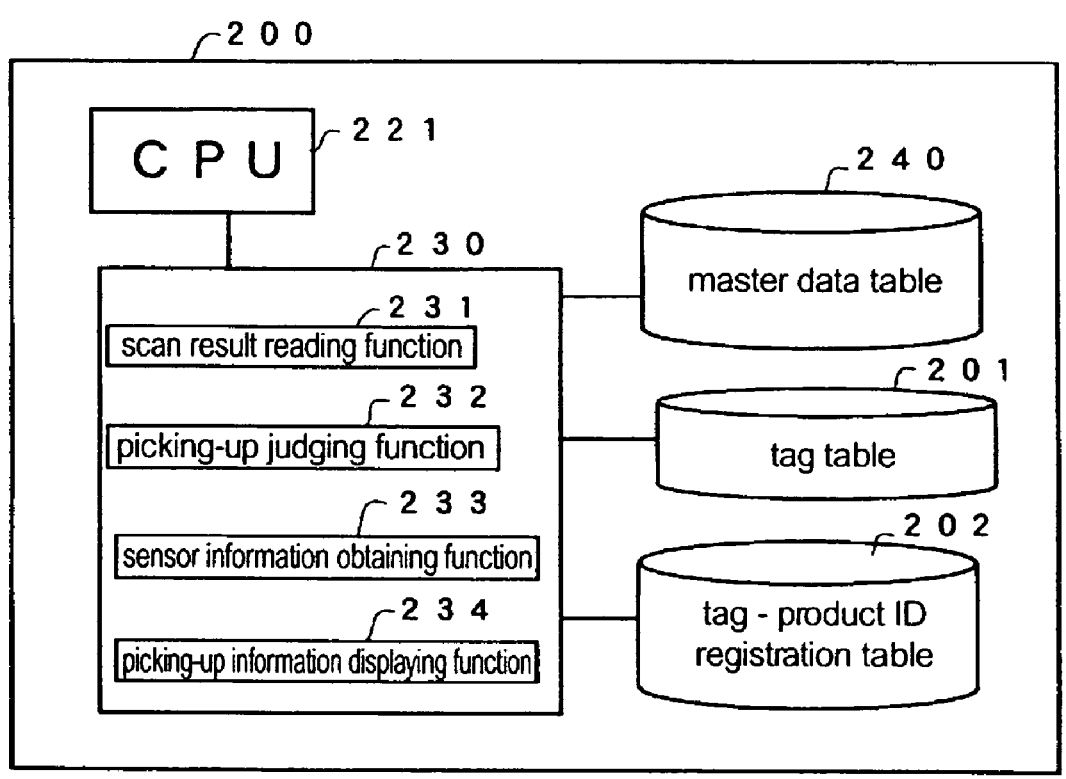
FIG. 8 A view showing the control computer of the present embodiment.

As shown in FIG. 8, the control computer 200 comprises a tag table 201 registering trace information of the products for each RFID tag, a tag-product ID registration table 202 registering the relationship between the RFID tags and the products applied with the RFID tags respectively, a master data table 204 managing information of the products being picked up from the shelves (explained below), a memory 230 storing programs for executing functions to implement the managing operation (explained below) using the information stored in the above tables and a CPU 221 for controlling the above tables (201, 202 and 240) and memory 230. The CPU 221 executes functions of being inputted the IDs (tag serial numbers) of the RFID tags detected by each of the antennas on the product display shelves 110 to 130 of the intelligent shelf 100 and detection signal of a human body from the human body sensors S disposed on the front side of the intelligent shelf 100, collecting various information such as picking-up/returning of the products in connection with each intelligent shelf/product display shelf/antenna on each product display shelf and the customers' behavior referring to the information registered in the tag table 201 and the tag-product ID registration table 202, and storing the collected information in the master data table 240.

The program stored in the memory 230 may comprise, but not limited to, a scan result reading function 231 of reading the result of scanning the signals detected by each of the antennas on the product display shelves 110 to 130 of the intelligent shelf 100, a picking-up judging function 232 of judging the products being picked up based on the detection result of the scan result reading function 231, a sensor information obtaining function 233 of obtaining signals from the human body sensors S and a picking-up information displaying function 234 of generating and displaying the customer' purchase behavior information for the products based on the various information collected by means of the above functions.

As shown in FIG. 4, the information stored in the tag table 201 includes tag serial numbers (UIDs) each uniquely given to the RFID tags, product codes given to each of the products applied with the RFID tags having the tag serial numbers, product IDs given to each kind of product, number of times the RFID tags have been reused and the registration date and time. For example, in FIG. 4, a tag having a tag serial number (UID) of "FFFFFFFFFF0001" applied on a product having a product code of "00000000256"/a product ID of "0007" is first used on Jun. 12, 2005. The same tag has been used on a product having a product code of "00000000001"/a product ID of "0111" for five times as of Jul. 10, 2005.

As shown in FIG. 5, the information stored in the tag-product ID registration table 202 includes tag serial numbers (UIDs) presently given to the RFID tags and product names/product IDs/numbers of times being reused of the products applied with the RFID tags having the tag serial numbers. For example, in FIG. 5, a tag having a tag serial number (UID) of "FFFFFFFFFF0001" is being used for a product named "detergent A"/having a product ID of "0111" fifth time.

Figure 9:
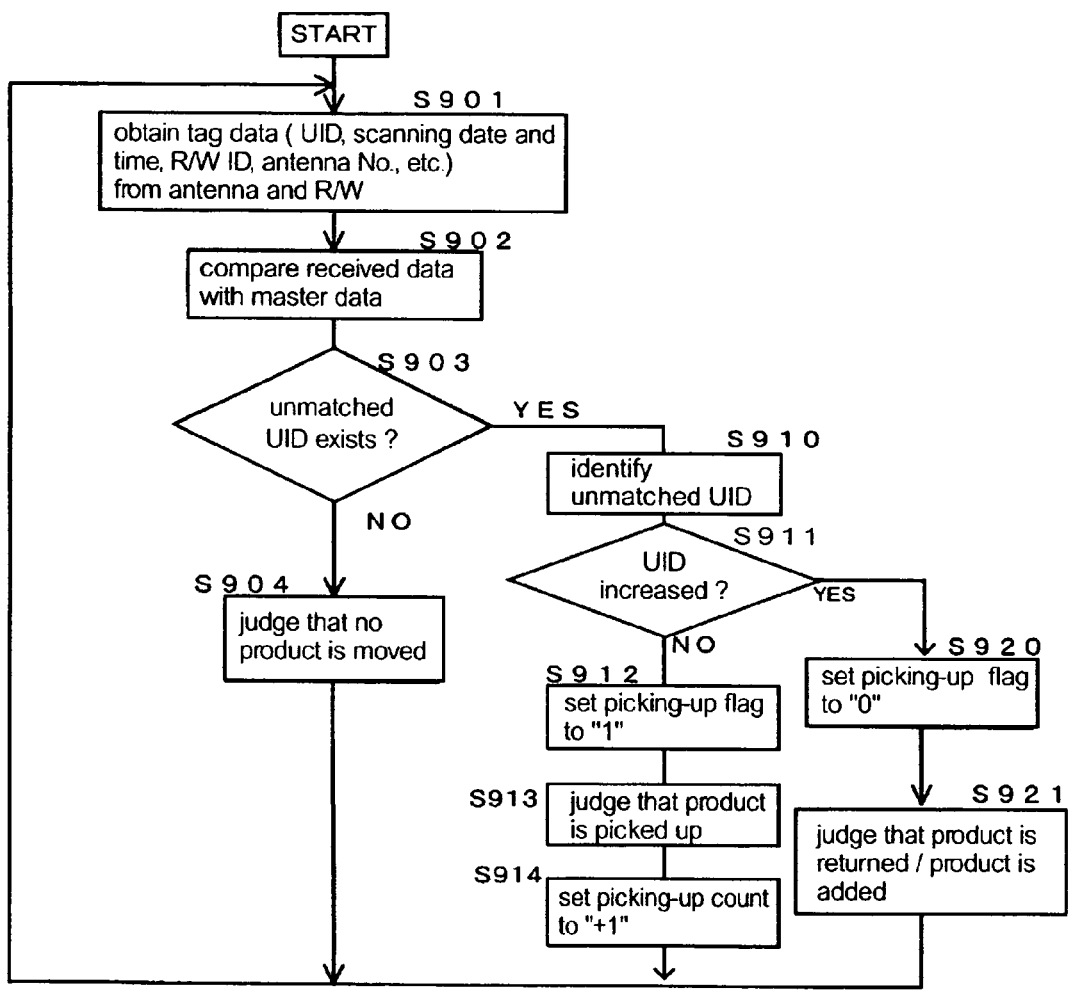
FIG. 9 A view showing operation of the control computer of the present embodiment.

The master data table 240 stores the information stored in the tag table 201 and the tag-product ID registration table 202 and the information obtained by scanning (explained below). As shown in FIG. 11, the master data table 240 stores, for each scanning time span (every one second), product categories such as detergent/shampoo displayed on each area of the whole shelf, specific product names such as "detergent A", product codes of the products, product IDs, tag serial numbers (UIDs) of the RFID tags applied on the products, registration dates of the tags, retail store names displaying the products, shelf numbers, antenna numbers (for example, "1-2" which represents the center position of the first shelf), display area (area on a row) corresponding to the antenna numbers, dates and times of beginning display, dates and times of ending display (dates and times at which the products are picked up and turned undetectable over a predetermined time period), picking-up counts which represent the numbers of times each product is picked up and returned by the customers and picking-up flags indicating the products being picked up ("1" indicates detection of picking-up, "0" indicates non-detection of picking-up and initial value is "0"). Once the above data sets are stored as the initial values (under condition that the products are placed on the predetermined position on the shelves), it is not necessary to store all the data items every one second. The scanning time is the date and time (year, month, day, hour, minute and second) at which the routine shown in FIG. 9 is implemented. The above information of product categories/specific product names/ . . . /picking-up flags in the table 240 are referred to as "product records". The scanning time span may vary depending on the number of tags read, for example within the range of 0.1 to 3 seconds.

Figure 12:
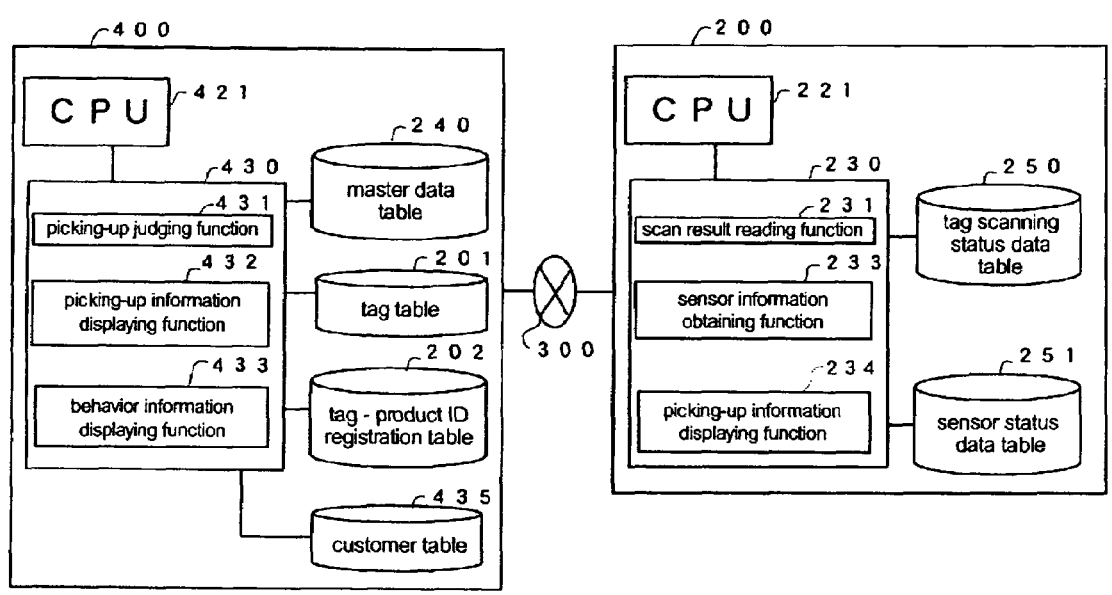
FIG. 12 A view showing the control computer and center server system according to another embodiment of the present invention.

The center server system 400 comprises a server 401, the server 401 having a program implementing the function of collecting or statistically processing information received from the control computer 200 by way of the communication line 300 as the information of each retail stores and writing the product code and the number of times of reuse on an RFID tag R using the antenna 403 and the reader/writer 402. Although the system is constructed in such a way that the functions are centralized in the control computer 200 in the above-described example, the system of the present invention is not limited to such construction and part of functions of the control computer 200 such as data collecting function may be built on the center server system. FIG. 12 shows the system such constructed, in which the control computer 200 comprises a memory 230 storing a program to implement a scan result reading function 231 of reading the result of scanning/a sensor information obtaining function 233 of obtaining sensing information from the sensors/a picking-up information displaying function 234 of displaying the information of the products picked up (explained below) a tag scanning status data table 250 storing tag scanning status obtained by means of the scan result reading function 231 and a sensor status data table 251, while the center server system 400 comprises a memory 430 storing a program to implement a picking-up judging function 431 same as in the above embodiment/a picking-up information displaying function 432/behavior information displaying function 433 (explained below), a master data table 240/a tag table 201/a tag-product ID registration table 202 same as in the above embodiment, a customer information table 435 storing customer information of a plurality of customers and a CPU for controlling the tables and memory.

<Description of Operation>

The operation of the purchase behavior analysis system which includes the product displaying system will be described below with reference to the drawings. First, the server 401 of the center server system 400 shown in FIG. 1 registers in a RFID tag R the product code of the product applied with the RFID tag R and the number of times the RFID tag R is used by means of the reader/writer 402 and the antenna 403. Printed label representing the product name and the like may be applied to the RFID tag R.

As shown in the tag table 201 in FIG. 4, registration date and time/product codes/product IDs/numbers of times of reuse each for the tag serial numbers (UIDs) of the RFID tags R are registered as the registration information of the RFID tags R.

Next, in a retail store, the RFID tags R for which the product codes and the numbers of times of reuse are registered are applied to the surfaces or bottom faces of the products. The products applied with the RFID tags R are displayed on the left/center/right areas of the shelves of the intelligent shelf 100. In the example of FIG. 1, for example, the product A, the product B and the product C are placed on the left area, the center area and the right area, respectively.

In the product displaying system of the present embodiment as such, the antennas 112a to 112c placed on the left/center/right of each of the product display shelves 120 each communicates with the RFID tags R of the products A to C displayed and the switch 151 convert the tag serial numbers (UIDs) of the RFID tags R obtained in the communication, the converted tag serial numbers (UIDs) being sent to the control computer 200 by means of reader/writer 152.

The control computer 200, upon receipt of the tag serial numbers (UIDs), searches in the tag-product ID registration table 202 for the tag serial numbers (UIDs) of the RFID tags R and the antennas transmitting the information, to recognize the areas (left/center/right) and the shelves on which the products are each positioned and store the recognized information in a memory device such as hard disk.

In this state, when the product is picked up from the shelf by a customer, the control computer 200 recognizes which of the products is picked up and the area (left/center/right), the row and the shelf on which the product was placed. In case the picked-up product is returned to the same shelf, the antennas again communicate with the RFID tag R of the same product, thereby enabling the control computer 200 to recognize the same product is returned to the same shelf. Particularly in the present embodiment, it is possible to detect each product being picked up (separated) from the shelves regardless of the kinds of the products by each antennas independently detecting the tag serial numbers each unique to the RFID tags R applied on each of the products.

Next, the operation of the control computer 200 of the function-centralized type is explained with reference to FIG. 9. The control computer 200 of this type of system first implements a step S901 of receiving the tag data (UIDs, scanning dates and times, IDs of the R/Ws, antenna numbers, etc.) of the RIFD tags R obtained from the antennas 112a to 112c of the product display shelves 120 of the intelligent shelf 100 communicating with the RIFD tags R, a step S902 of comparing the received tag serial numbers (UIDs) with the initial value of the tag serial numbers of the product records stored in the master data table 240 and a step S903 of judging from the result of the comparing step S902 whether or not there is a tag serial number (UID) that was not matched (i.e., whether or not there is an UID that was registered in the master data table 240 but was not detected due to the product being picked up).

Next, in step S904, the control computer 200 judges that no product was moved in case the result of the judging step S903 is "NO" (i.e., in case no product is picked up).

In case the result of the judging step S903 is "YES" (i.e., in case a product is moved or added), the control computer 200 implements a step S910 of identifying the unmatched UID and a step S911 of judging whether or not the number of UIDs increased. In case the judging result is "NO" (i.e., in case the number of the products was reduced), the control computer 200 implements a step S912 of setting the picking-up flag in the product record corresponding to the identified UID to "1", a step S913 of judging that the product was picked up and a step S914 of setting the number of times picked-up in the product record corresponding to the identified UID to "+1".

In case the judging result in the 5911 of judging whether or not the number of UIDs increased is "Y" (i.e., in case the number of the tags was increased), the system implements a step S920 of setting the picking-up flag in the product record corresponding to the increased UID to "0" and a step S921 of judging that a product is returned or a product is added. By returning to the step S901 after implementing either one of the step S904/step S914/step S921, the system can operate to judge, every one second, whether or not a product is picked up from the shelves or returned to the shelves and record the information in the master data table 240. The scanning time herein represents the date, hour, minute and second at which the whole routine shown in FIG. 9 is implemented. Instead of implementing the above process every one second, it may be implemented as a batch process with the received data in the step S901 stored up.

As described in the above, the control computer 200 of the present embodiment operates, everyone second, to compare the tag serial numbers (UIDs) detected in the areas of the product display shelf 110 with the tag serial numbers stored in the master data table 240, identify the unmatched tag serial numbers due to the products being picked up from the shelves, set the picking-up flags of the product records corresponding to the unmatched tag serial numbers to "1", judging that the products once picked up are not yet returned to the shelves in case the tag serial numbers on the product records having the picking up flags of "1" are not detected and judging that the products having been picked up are already returned to the shelves in case the tag serial numbers on the product records having the picking up flags of "1" are detected.

In the product displaying system according to the present invention, the control computer 200 can detect and report to the administrator that a product being returned to a different position from a predetermined display position by communicating with the RFID tag of the returned product by means of the antenna when it is judged that a customer returned a product to a different position or added a new product to the shelves in the step S921.

In the product displaying system of the present embodiment, it is possible to operate the control computer 200 to search the obtained information and to display the obtained information in a list form on a display device. As shown in FIG. 6, the search result list display image 203 represents information such as product categories such as detergent/shampoo displayed on each area of the whole shelf, specific product names such as "detergent A", product codes of the products, product IDs, tag serial numbers (UIDs) of the RFID tags applied on the products, registration dates of the tags, retail store names displaying the products, shelf numbers, antenna numbers (for example, "1-2" which represents the center position of the first shelf), display area (area on a row) corresponding to the antenna numbers, dates and times of beginning display, dates and times of ending display (dates and times at which the products are picked up and turned undetectable over a predetermined time period), picking-up counts which represent the numbers of times each product is picked up and returned by the customers and picking-up flags indicating the products being picked up.

Figure 7:
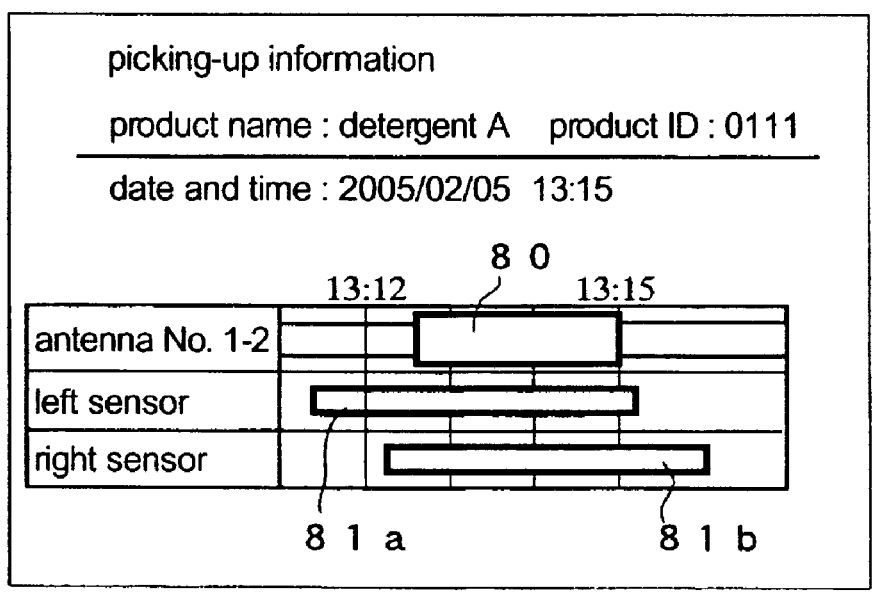
FIG. 7 A view showing a display image of the product picking-up information of the present embodiment.

In the product displaying system of the present embodiment, the control computer 200, for example, stores in the master data table 240 the dates and times at which human bodies are detected by the human body sensors S disposed on the front side of the intelligent shelf 100 and combine the detection information with information with the various information represented in the search result list display image as shown in FIG. 6 so as to display the customer behavior information. Shown in FIG. 7 is a customer's behavior of approaching from the left side of the shelf at around 13:11 detected by the left sensor as indicated by the bar 81a, picking up the product at around 13:12:30 detected by the antenna (i.e., the RFID tag of the product turned undetectable by the antenna) as indicated by the bar 80, holding the product for about two and a half minutes (i.e., the product was apart from the shelf), returning the product to the shelf at around 13:15 as indicated by the bar 80 and moving in the right direction detected by the right sensor as indicated by the bar 81b, when the detergent A having a product code of "0111" was picked up on Feb. 5, 2005. Thus, in the product displaying system of the present invention, the administrator can easily obtain the customer's behavior information that the customer approached the shelf from the left side, once picked up the product and returned it to the shelf and walked away in the right direction from the shelf by means of the display image in which the detection information of the RFID tags and the detection information of the right and left sensors are indicated in the form parallel time bars in time series.

Figure 10:
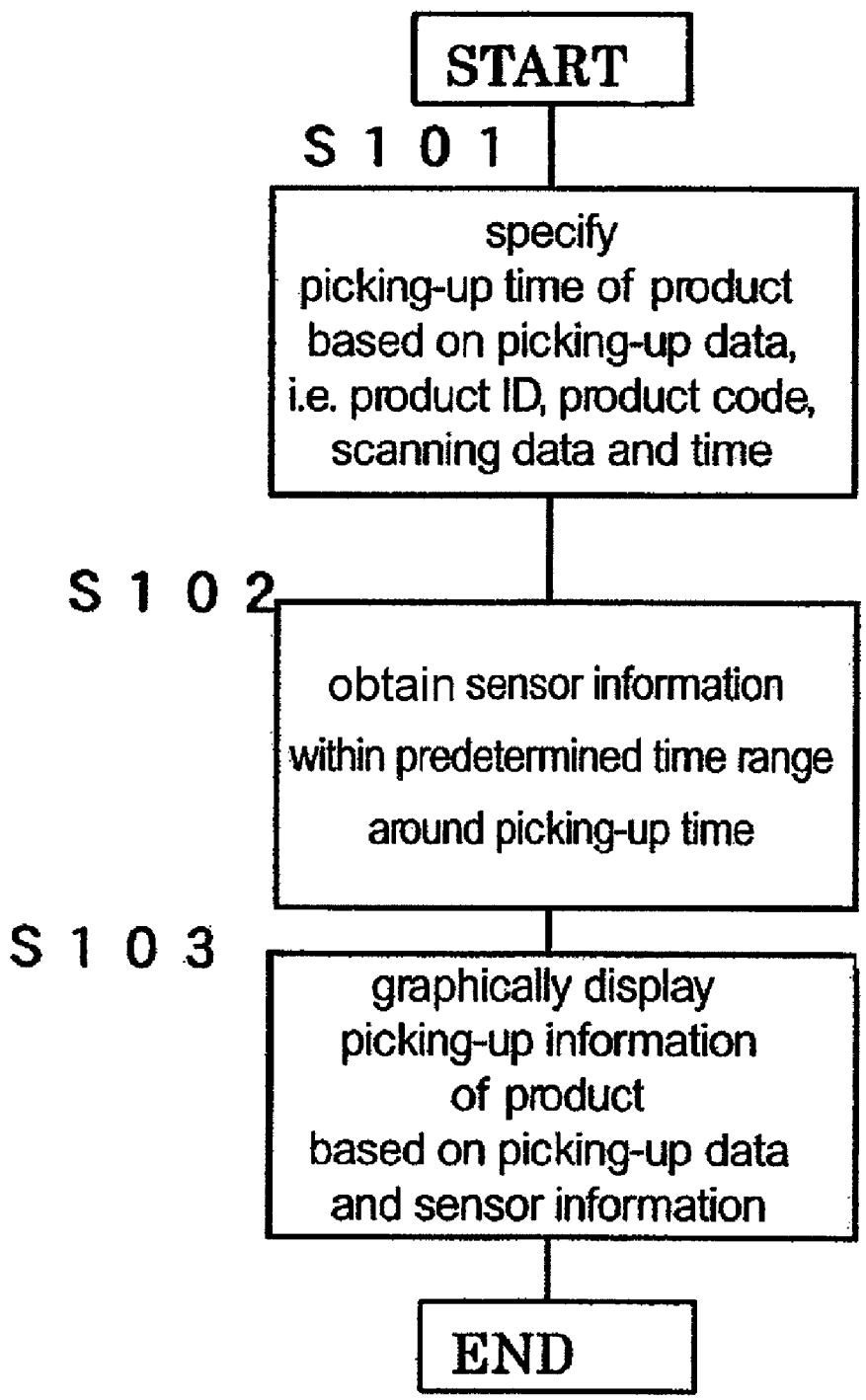
FIG. 10 A view showing operation of the control computer of the present embodiment.

As shown in FIG. 10, the control computer 200 implements the above process by implementing a step S101 of specifying the picking-up time at which a product is picked up based on the picking-up data including product ID/product code/scanning date and time specified in the step S913, a step S102 of obtaining human body sensor information within a predetermined time range around the picking-up time (e.g., within 10 minutes before and after the picking-up time) and a step S103 of displaying the picking-up information of the product based on the picking-up data and the sensor information in a graphical format as shown in FIG. 7.

Thus, according to the product displaying system of the present embodiment, it is possible to judge the direction a customer approached from and the direction a customer walked away into based on the difference of the detection time in the right and left human body sensors S. By displaying this human body detection information combined with the detection signals of the RFID tags R of each product, the administrator can easily obtain an objective information of the customers' behavior.

Furthermore, according to the product displaying system of the present embodiment, it is possible to judge that a product has fallen off when the product has turned undetectable by the antennas without the human sensors S detecting any human body.

According to the purchase behavior analysis program of the product displaying system of the present embodiment, it is possible to obtain useful information such as the customer behavior information of a customer picking up several products of a same kind and selecting a particular product as the center server system 400 receives from the control computer 200 the customer behavior information collected by the control computer 200 and analyzes the customers' purchase behavior. Such information is useful for product development in terms of package design/positioning of the shelves of the retail store/displaying position on the shelves (e.g. rows, left or right).

The RFID tags are removed from the products when the products are purchased and the server 401 of the center server system 400 renews the information of the product codes and the numbers of times of use of the removed RFID tags in the tag table 201 using the antennas 403 and the reader/writer 402, such that the RIID tags can be used again.

Although the RFID tags are applied to the bottom face of the products in the present embodiment, the present invention is not limited to this example. The RFID tags may be applied to the upper face or side face of the products while the antennas are disposed in such a position that it is easy to read the tag information.

What is claimed is:
1. A product displaying system comprising:
a plurality of product display shelves displaying a plurality of products, such that each respective product of the plurality of products has a respective RFID tag applied thereto, and such that each respective RFID tag stores a unique tag serial number;
a plurality of antennas disposed on said plurality of product display shelves, each antenna of said plurality of antennas having a unique antenna number and each antenna of said plurality of antennas detecting the unique tag serial number from the respective RFID tag applied to a particular product of the plurality of products located within a predetermined area;

human body sensors disposed at different positions on a front side of said plurality of product display shelves and detecting an approach of a human body; and a control computer including a tag-product ID registration table storing the unique tag serial number of each respective RFID tag and storing a unique product ID of each of the plurality of products, such that each stored unique tag serial number corresponds to each stored unique product ID, wherein said control computer receives the unique tag serial number of a respective RFID tag detected by said plurality of antennas and receives a detection time at which said human body sensors detect the approach of the human body, wherein said control computer detects at least one of (i) that a particular product of the plurality of products is picked up from a particular product display shelf of said plurality of product display shelves, and (ii) that a particular product of the plurality of products is returned to a particular product display shelf of said plurality of product display shelves, said control computer performing the detection by combining the unique tag serial number of the respective RFID tag and the unique antenna number of an antenna of the plurality of antennas that detected the unique tag serial number, wherein said control computer determines which direction the detected human body has moved based on a difference between the detection time of detecting the approaching human body obtained by each of said human body sensors, and wherein said control computer comprises a display device simultaneously displaying in parallel both a first bar indication and a second bar indication, such that the first bar indication represents, in time series, times at which a particular product of the plurality of products on a particular product display shelf of said plurality of product display shelves was picked up from the particular product display shelf and returned to the particular product display shelf, and such that the second bar indication represents, in time series, times at which the human body is detected by said human body sensors or times at which the human body is not detected by said human body sensors.

2. A product displaying system comprising:

a plurality of product display shelves displaying a plurality of products, such that each respective product of the plurality of products has a respective RFID tag applied thereto, and such that each respective RFID tag stores a unique tag serial number;

a plurality of antennas disposed on said plurality of product display shelves, each antenna of said plurality of antennas having a unique antenna number and each antenna of said plurality of antennas detecting the unique tag serial number from the respective RFID tag applied to a particular product of the plurality of products located within a predetermined area;

human body sensors disposed at different positions on a front side of said plurality of product display shelves and detecting an approach of a human body; and a control computer including a tag-product ID registration table storing the unique tag serial number of each respective RFID tag and storing a unique product ID of each of the plurality of products, such that each stored unique tag serial number corresponds to each stored unique product ID, wherein said control computer receives the unique tag serial number of a respective RFID tag detected by said plurality of antennas and receives a detection time at which said human body sensors detect the approach of the human body, wherein said control computer detects at least one of (i) that a particular product of the plurality of products is picked up from a particular product display shelf of said plurality of product display shelves, and (ii) that a particular product of the plurality of products is returned to a particular product display shelf of said plurality of product display shelves, said control computer performing the detection by combining the unique tag serial number of the respective RFID tag and the unique antenna number of an antenna of the plurality of antennas that detected the unique tag serial number, wherein said control computer determines which direction the detected human body has moved based on a difference between the detection time of detecting the approaching human body obtained by each of said human body sensors, wherein each of said plurality of antennas is disposed on a predetermined position of said plurality of product display shelves and each of said plurality of antennas communicate with each respective RFID tag applied on a surface of each of the plurality of products, and wherein said control computer comprises a display device simultaneously displaying in parallel both a first bar indication and a second bar indication, such that the first bar indication represents, in time series, times at which a particular product of the plurality of products on a particular product display shelf of said plurality of product display shelves was picked up from the particular product display shelf and returned to the particular product display shelf, and such that the second bar indication represents, in time series, times at which the human body is detected by said human body sensors or times at which the human body is not detected by said human body sensors.

3. A product displaying system comprising:

a plurality of product display shelves displaying a plurality of products, such that each respective product of the plurality of products has a respective RFID tag applied thereto, and such that each respective RFID tag stores a unique tag serial number;

a plurality of antennas disposed on said plurality of product display shelves, each antenna of said plurality of antennas having a unique antenna number and each antenna of said plurality of antennas detecting the unique tag serial number from the respective RFID tag applied to a particular product of the plurality of products located within a predetermined area;

human body sensors disposed at different positions on a front side of said plurality of product display shelves and detecting an approach of a human body; and a control computer including a tag-product ID registration table storing the unique tag serial number of each respective RFID tag and storing a unique product ID of each of the plurality of products, such that each stored unique tag serial number corresponds to each stored unique product ID, wherein said control computer receives the unique tag serial number of a respective RFID tag detected by said plurality of antennas and receives a detection time at which said human body sensors detect the approach of the human body, wherein said control computer detects at least one of (i) that a particular product of the plurality of products is picked up from a particular product display shelf of said plurality of product display shelves, and (ii) that a particular product of the plurality of products is returned to a particular product display shelf of said plurality of product display shelves, said control computer performing the detection by combining the unique tag serial number of the respective RFID tag and the unique antenna number of an antenna of the plurality of antennas that detected the unique tag serial number, wherein said control computer determines which direction the detected human body has moved based on a difference between the detection time of detecting the approaching human body obtained by each of said human body sensors, wherein each of said plurality of antennas is disposed on a predetermined position of said plurality of product display shelves and each of said plurality of antennas communicate with each respective RFID tag applied on a top of each of the plurality of products, and wherein said control computer comprises a display device simultaneously displaying in parallel both a first bar indication and a second bar indication, such that the first bar indication represents, in time series, times at which a particular product of the plurality of products on a particular product display shelf of said plurality of product display shelves was picked up from the particular product display shelf and returned to the particular product display shelf, and such that the second bar indication represents, in time series, times at which the human body is detected by said human body sensors or times at which the human body is not detected by said human body sensors.

4. A non-transitory computer-readable recording medium having a purchase behavior analysis program for a product displaying system recorded thereon, the purchase behavior analysis program for determining a customers' purchase behavior for a plurality of products displayed on a plurality of product display shelves of the product displaying system, wherein the product displaying system includes the plurality of product display shelves displaying a plurality of products, such that each respective product of the plurality of products has a respective RFID tag applied thereto, and such that each respective RFID tag stores a unique tag serial number, wherein the product displaying system includes a plurality of antennas disposed on the plurality of product display shelves, each antenna of the plurality of antennas having a unique antenna number and each antenna of the plurality of antennas detecting the unique tag serial number from the respective RFID tag applied to a particular product of the plurality of products located within a predetermined area, wherein the product displaying system includes human body sensors disposed at different positions on a front side of the plurality of product display shelves and detecting an approach of a human body, wherein the product displaying system includes a control computer having a tag-product ID registration table storing the unique tag serial number of each respective RFID tag and storing a unique product ID of each of the plurality of products, such that each stored unique tag serial number corresponds to each stored unique product ID, and such that the control computer receives the unique tag serial number of a respective RFID tag detected by the plurality of antennas and receives a detection time at which the human body sensors detect the approach of the human body, wherein the product displaying system includes a display device, and wherein the purchase behavior analysis program causes the control computer to execute a method comprising:
 detecting at least one of
  (i) that a particular product of the plurality of products is picked up from a particular product display shelf of the plurality of product display shelves, and (ii) that a particular product of the plurality of products is returned to a particular product display shelf of the plurality of product display shelves, the control computer performing the detection by combining the unique tag serial number of the respective RFID tag and the unique antenna number of an antenna of the plurality of antennas that detected the unique tag serial number;
 judging which direction the detected human body has moved based on a difference between the detection time of detecting the approaching human body obtained by each of the human body sensors; and
 simultaneously displaying, on the display device, in parallel both a first bar indication and a second bar indication, such that the first bar indication displays, in time series, times at which a particular product of the plurality of products on a particular product display shelf of the plurality of product display shelves was picked up from the particular product display shelf and returned to the particular product display shelf, and such that the second bar indication displays, in time series, times at which the human body is detected by the human body sensors or times at which the human body is not detected by the human body sensors.

5. A product displaying system comprising:
a plurality of product display shelves displaying a plurality of products, such that each respective product of the plurality of products has a respective RFID tag applied thereto, and such that each respective RFID tag stores a unique tag serial number;

a plurality of antennas disposed on said plurality of product display shelves, each antenna of said plurality of antennas having a unique antenna number and each antenna of said plurality of antennas detecting the unique tag serial number from the respective RFID tag applied to a particular product of the plurality of products located within a predetermined area human body sensors disposed at different positions on a front side of said plurality of product display shelves and detecting an approach of a human body;

a control computer including a tag-product ID registration table storing the unique tag serial number of each respective RFID tag and storing a unique product ID of each of the plurality of products, such that each stored unique tag serial number corresponds to each stored unique product ID;

a plurality of partitions partitioning each of said plurality of product display shelves into a plurality of areas, each of said plurality of areas having at least one of said plurality of antennas set thereon; and switches and reader/writers, or reader/writers having a switching function switching from among said plurality of antennas to send the unique tag serial number of each respective RFID tag to said control computer, wherein said control computer receives the unique tag serial number of a respective RFID tag detected by said plurality of antennas and receives a detection time at which said human body sensors detect the approach of the human body, wherein said control computer detects at least one of (i) that a particular product of the plurality of products is picked up from a particular product display shelf of said plurality of product display shelves, and (ii) that a particular product of the plurality of products is returned to a particular product display shelf of said plurality of product display shelves, said control computer performing the detection by combining the unique tag serial number of the respective RFID tag and the unique antenna number of an antenna of the plurality of antennas that detected the unique tag serial number, wherein said control computer determines which direction the detected human body has moved based on a difference between the detection time of detecting the approaching human body obtained by each of said human body sensors, and wherein said control computer comprises a display device simultaneously displaying in parallel both a first bar indication and a second bar indication, such that the first bar indication represents, in time series, times at which a particular product of the plurality of products on a particular product display shelf of said plurality of product display shelves was picked up from the particular product display shelf and returned to the particular product display shelf, and such that the second bar indication represents, in time series, times at which the human body is detected by said human body sensors or times at which the human body is not detected by said human body sensors.

6. A product displaying system comprising:

a plurality of product display shelves displaying a plurality of products, such that each respective product of the plurality of products has a respective RFID tag applied thereto, and such that each respective RFID tag stores a unique tag serial number;

a plurality of antennas disposed on said plurality of product display shelves, each antenna of said plurality of antennas having a unique antenna number and each antenna of said plurality of antennas detecting the unique tag serial number from the respective RFID tag applied to a particular product of the plurality of products located within a predetermined area;

human body sensors disposed at different positions on a front side of said plurality of product display shelves and detecting an approach of a human body;

a control computer including a tag-product ID registration table storing the unique tag serial number of each respective RFID tag and storing a unique product ID of each of the plurality of products, such that each stored unique tag serial number corresponds to each stored unique product ID;

a plurality of partitions partitioning each of said plurality of product display shelves into a plurality of areas, each of said plurality of areas having at least one of said plurality of antennas set thereon; and switches and reader/writers, or reader/writers having a switching function switching from among said plurality of antennas to send the unique tag serial number of each respective RFID tag to said control computer, wherein said control computer receives the unique tag serial number of a respective RFID tag detected by said plurality of antennas and receives a detection time at which said human body sensors detect the approach of the human body, wherein said control computer detects at least one of (i) that a particular product of the plurality of products is picked up from a particular product display shelf of said plurality of product display shelves, and (ii) that a particular product of the plurality of products is returned to a particular product display shelf of said plurality of product display shelves, said control computer performing the detection by combining the unique tag serial number of the respective RFID tag and the unique antenna number of an antenna of the plurality of antennas that detected the unique tag serial number, wherein said control computer determines which direction the detected human body has moved based on a difference between the detection time of detecting the approaching human body obtained by each of said human body sensors, wherein each of said plurality of antennas is disposed on a predetermined position of said plurality of product display shelves and each of said plurality of antennas communicate with each respective RFID tag applied on a surface of each of the plurality of products, and wherein said control computer comprises a display device simultaneously displaying in parallel both a first bar indication and a second bar indication, such that the first bar indication represents, in time series, times at which a particular product of the plurality of products on a particular product display shelf of said plurality of product display shelves was picked up from the particular product display shelf and returned to the particular product display shelf, and such that the second bar indication represents, in time series, times at which the human body is detected by said human body sensors or times at which the human body is not detected by said human body sensors.

7. A product displaying system, comprising:

a plurality of product display shelves displaying a plurality of products, such that each respective product of the plurality of products has a respective RFID tag applied thereto, and such that each respective RFID tag stores a unique tag serial number;

a plurality of antennas disposed on said plurality of product display shelves, each antenna of said plurality of antennas having a unique antenna number and each antenna of said plurality of antennas detecting the unique tag serial number from the respective RFID tag applied to a particular product of the plurality of products located within a predetermined area;

human body sensors disposed at different positions on a front side of said plurality of product display shelves and detecting an approach of a human body;

a control computer including a tag-product ID registration table storing the unique tag serial number of each respective RFID tag and storing a unique product ID of each of the plurality of products, such that each stored unique tag serial number corresponds to each stored unique product ID;

a plurality of partitions partitioning each of said plurality of product display shelves into a plurality of areas, each of said plurality of areas having at least one of said plurality of antennas set thereon; and switches and reader/writers, or reader/writers having a switching function switching from among said plurality of antennas to send the unique tag serial number of each respective RFID tag to said control computer, wherein said control computer receives the unique tag serial number of a respective RFID tag detected by said plurality of antennas and receives a detection time at which said human body sensors detect the approach of the human body, wherein said control computer detects at least one of (i) that a particular product of the plurality of products is picked up from a particular product display shelf of said plurality of product display shelves, and (ii) that a particular product of the plurality of products is returned to a particular product display shelf of said plurality of product display shelves, said control computer performing the detection by combining the unique tag serial number of the respective RFID tag and the unique antenna number of an antenna of the plurality of antennas that detected the unique tag serial number, wherein said control computer determines which direction the detected human body has moved based on a difference between the detection time of detecting the approaching human body obtained by each of said human body sensors, wherein each of said plurality of antennas is disposed on a predetermined position of said plurality of product display shelves and each of said plurality of antennas communicate with each respective RFID tag applied on a top of each of the plurality of products, and wherein said control computer comprises a display device simultaneously displaying in parallel both a first bar indication and a second bar indication, such that the first bar indication represents, in time series, times at which a particular product of the plurality of products on a particular product display shelf of said plurality of product display shelves was picked up from the particular product display shelf and returned to the particular product display shelf, and such that the second bar indication represents, in time series, times at which the human body is detected by said human body sensors or times at which the human body is not detected by said human body sensors.

* * * * *